Figure 1:
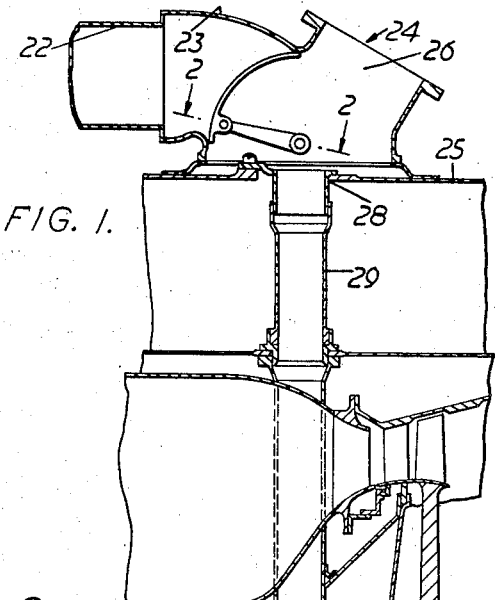

Oct. 29, 1963  F. W. W. MORLEY ETAL  3,108,434
GAS TURBINE ENGINES

Filed April 25, 1960  2 Sheets-Sheet 1

Frederick W. W. Morley,
Donald M. Onley, &
Geoffrey P. Torrance
Inventors

By
Fred L. Witherspoon, Jr. &
Fred E. Shoemaker  Attorneys

Oct. 29, 1963 F. W. W. MORLEY ETAL 3,108,434
GAS TURBINE ENGINES
Filed April 25, 1960 2 Sheets-Sheet 2

Frederick W. W. Morley,
Donald M. Orley, &
Geoffrey P. Torrance
Inventors

By
Fred L. Witherspoon, Jr. &
Fred. E. Shoemaker Attorneys

United States Patent Office 3,108,434
Patented Oct. 29, 1963

3,108,434
GAS TURBINE ENGINES
Frederick William Walton Morley, Castle Donington, Donald M. Anley, Hucknall, and Geoffrey P. Torrance, Chellaston, England, assignors to Rolls-Royce Limited, Derby, England, a company of Great Britain
Filed Apr. 25, 1960, Ser. No. 24,344
Claims priority, application Great Britain May 1, 1959
5 Claims. (Cl. 60—39.07)

This invention relates to gas turbine engines.

According to the present invention there is provided a gas turbine engine having a duct for the passage therethrough of hot gas (e.g. hot air), said duct being provided with two branches, closure means for selectively blocking one or other of the branches and for simultaneously effecting unblocking of the other branch, and control means, operative upon the temperature of said gas being at or above a predetermined value, for ensuring that a predetermined one of said branches is unblocked.

In addition to the control means mentioned above, the closure means can be under control of a second control means which ensures that a predetermined one of the branches is at least partially unblocked when the temperature of a medium (e.g. fuel) which is to be heated by the hot gas falls below a predetermined value.

Preferably one of said branches is open so as to be vented to atmosphere and the other branch communicates with a heat exchanger arranged to heat fuel supplied to the engine.

The branch leading to the heat exchanger can be blocked, under control of the first-mentioned control means, if the temperature of the hot gas reaches or exceeds a predetermined value. The first-mentioned control means will thus overrride the second control means if the hot gas temperature reaches a dangerously high level.

The branch leading to the heat exchanger can be at least partially unblocked under control of the second control means (thereby blocking the other branch an equivalent amount so as to maintain the total gas flow constant) when said fuel is at a predetermined relatively low temperature.

Thus the said heat exchanger may be provided with temperature responsive means forming part of the second control means which, when the fuel is at a predetermined low temperature, effects unblocking of the heat exchanger branch whereby the fuel is heated by the said hot gas. Thus icing of the fuel is prevented. The first-mentioned control means, however, is such that if the temperature of the hot gas rises above a predetermined value the heat exchanger branch is blocked by the closure means, the hot gas being vented to atmosphere through the open-ended branch. This ensures that the fuel passing through the heat exchanger is not heated to such an extent that it becomes volatile and therefore potentially explosive.

The said hot gas is preferably either ram air or compressor delivery air. Said ram air or compressor delivery air may be heated additionally by flowing over hot surfaces of the engine.

Preferably resilient means are provided for urging the closure means towards the position in which a predetermined one of said branches is unblocked, the first-mentioned control means including a heat fusible latch for normally rendering said resilient means ineffective.

Figure 2:
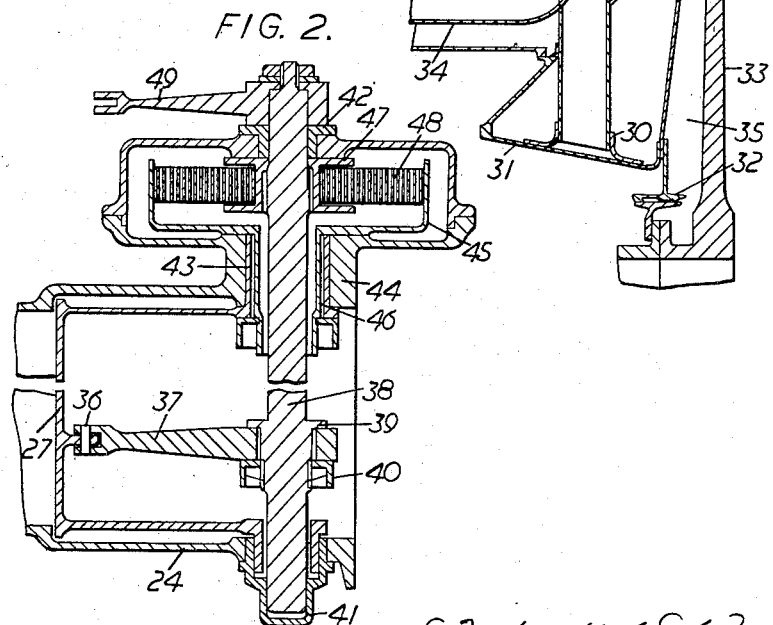
Figure 3:
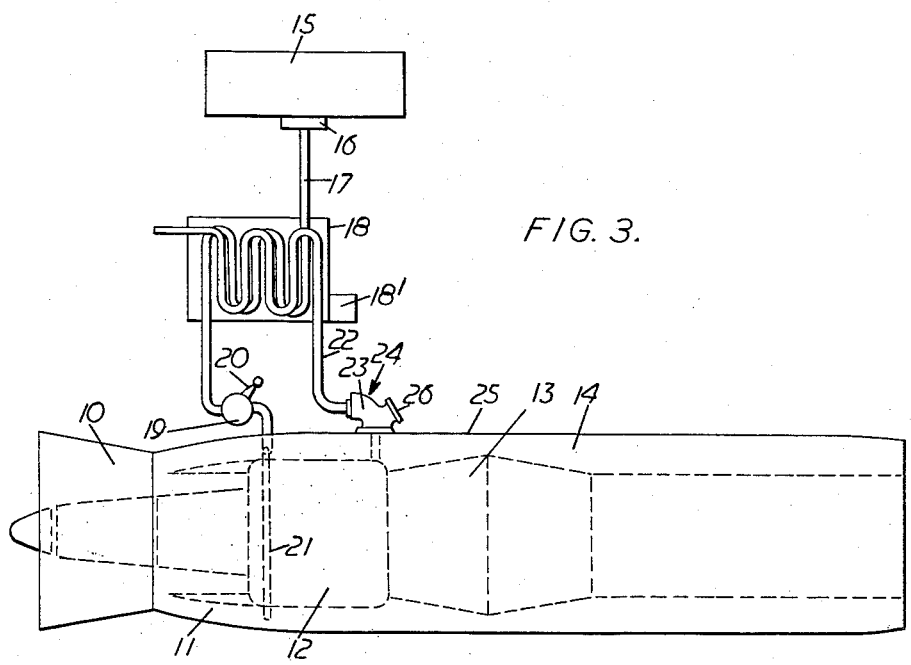

The invention is illustrated, merely by way of example, in the accompanying drawings, in which:

FIGURE 1 is a sectional elevation of part of a gas turbine engine incorporating the present invention, FIGURE 2 is a section taken on the line 2—2 of FIGURE 1, and FIGURE 3 is a diagrammatic representation of a complete gas turbine engine incorporating the present invention.

Referring first to FIGURE 3, a gas turbine, jet reaction, engine comprises in flow series an air intake 10, compressor 11, combustion equipment 12, turbine 13, and jet pipe 14.

The fuel for the combustion equipment 12 is supplied from a fuel tank 15 and is pumped by a backing pump 16 through a pipe 17 which passes through a heat exchanger 18.

Fuel, which has been de-iced as a result of passing through the heat exchanger 18, is supplied to a fuel control system which is, for simplicity, shown in FIGURE 3 as a valve 19 controlled by the pilot's throttle lever 20. Fuel from the said fuel control system is supplied to a ring manifold 21 from which it passes to the burners (not shown) of the combustion equipment 12.

A pipe 22 which is arranged in the heat exchanger 18 in heat exchange with the pipe 17, is adapted for the passage therethrough of hot air. The pipe 22 is connected to one branch 23 of a valve body 24 which is mounted on the engine casing 25. The other branch 26 of the valve body is open-ended so as to be open to the atmosphere.

A valve gate 27 is progressively movable (by means described below in detail) between the position shown in FIGURE 1 in which it blocks the branch 23 while permitting flow through the branch 26, and a position (not shown) in which it blocks the branch 26 and permits flow through the branch 23. The total hot air flow through the valve 24 remains constant with the type of valve shown.

One end 28 of a duct 29 is secured to the engine casing 25 so as to communicate with the interior of the valve body 24. the other (or inner) end 30 of the duct 29 communicates with a passage 31 through which flows air which is either ram air or air which has been compressed by the compressor 11.

The air flowing through the passage 31 has been heated as a result of having passed over hot surfaces within the engine in the course of being employed for cooling and sealing purposes.

One example of the use of the air for sealing purposes is illustrated in FIGURE 1 in which it will be noted that a labyrinth seal 32 is provided adjacent to a turbine disc 33. The combustion equipment 12 comprises combustion chambers 34 and if hot gases produced in the combustion chambers 34 should, as a result of a seal failure, flow onto the face 35 of the turbine disc 33, the seal 32 will prevent the hot gases flowing into the passage 31. This is because the pressure of the air in the passage 31 is greater than that of the said hot gases so that any leakage through the seal 32 will be of air and not of hot gases.

The valve gate 27 is connected by a fusible plug 36 to an arm 37 which is splined onto a rotatable shaft 38, the arm 37 being held against a shoulder 39 on the shaft 38 by a lock nut 40. The shaft 38 is journalled at its opposite ends in bearings 41, 42 carried by the valve body 24.

The valve gate 27 has a tubular portion 43 which is rotatably mounted in a throat portion 44 of the valve body 24. A cup shaped member 45 has a tubular portion 46 which is splined or otherwise secured within the tubular portion 43 of the valve gate 27.

Splined onto the shaft 38 is an annular spring housing 47 between which and the cup-shaped member 45 extends a coil (or watch) spring 48.

An arm 49 is secured to and extends radially off the shaft 38. The arm 49 is connected (by means not shown) to a temperature-responsive device 18' mounted on the heat exchanger 18.

In operation, when the temperature of the fuel flowing through the pipe 17 is at a predetermined low level, the temperature-sensitive device 18' on the heat exchanger 18 causes the shaft 38 to be turned to a position such that the valve gate 27 blocks the branch 26. Thus the hot air flowing through the duct 29 will be prevented from escaping to atmosphere and will be diverted through the branch 23 and pipe 22 so as to effect de-icing of the fuel.

If, however, the temperature of the hot air flowing through the duct 29 rises excessively (e.g. because a seal has failed and the air has become mixed with gases from the combustion equipment 12 or turbine 13) the fusible plug 36 will melt. Accordingly if, at this time, the valve gate 27 is blocking the branch 26, the valve gate 27 will be forced by the spring 48 into position shown in FIGURE 1 in which it blocks the branch 23. Thus excessively hot air will be prevented from flowing into the branch 23 and, instead, will be directed overboard. This is necessary since the excessively hot air might otherwise cause vapourisation of the fuel with the consequent possibility of explosion.

We claim:

1. Gas flow control apparatus comprising a hot gas conveying duct, first and second branch conduits having a common junction with said duct, valve means at the junction of the duct and conduits constructed to selectively close either one of said conduits and simultaneously open the other of said conduits, an actuator for adjusting the position of said valve means, a fusible member exposed to the hot gas in said duct and constructed to disintegrate when the gas temperature exceeds a predetermined value, said member positively connecting the actuator to said valve means, and spring biasing means interconnecting said actuator and said valve means in parallel to said fusible member, said biasing means being arranged to adjust said valve means to close said first conduit only when said fusible member disintegrates and irrespective of the position of said actuator.

2. Gas flow control apparatus comprising a hot gas conveying duct, first and second branch conduits having a junction with said duct, valve means at the junction of the duct and conduits constructed to selectively close either one of said conduits and simultaneously open the other, said valve means being so arranged that when its position is changed to block one of said branches by an increased amount, it unblocks the other branch by an equivalent amount, an actuator for progressively adjusting the position of said valve means, a fusible member exposed to the hot gas in said duct and constructed to disintegrate when the gas temperature exceeds a predetermined value, said member positively connecting the actuator to the valve means, and biasing means connected to said valve means for adjusting said valve means to close said first conduit when said fusible member disintegrates irrespective of the position of said actuator.

3. In a gas turbine engine, a hot gas conveying duct communicating with the engine and receiving a supply of hot gas therefrom, means branching said duct into first and second conduits, a fuel heater for heating fuel for the engine, means connecting said first conduit to said fuel heater to supply hot gas to impart heat to the fuel in the fuel heater, said second conduit leading to atmosphere, valve means at the branching means of the duct and conduits for selectively closing either one of said conduits and simultaneously opening the other of said conduits, an actuator responsive to fuel temperature for adjusting the position of said valve means to progressively block said first conduit as the fuel temperature rises, a fusible member connecting said actuator to said valve and being exposed to the hot gas in said duct and constructed to disintegrate when the gas temperature exceeds a predetermined value, and biasing means connected directly to said valve means, to adjust said valve means to close said first conduit when said fusible member disintegrates irrespective of the position of said actuator.

4. In a gas turbine engine, a hot gas conveying duct communicating with the engine and receiving a supply of hot gas therefrom, means branching said duct into first and second conduits, a fuel heater for heating fuel for the engine, means connecting said first conduit to said fuel heater to supply the hot gas to impart heat to the fuel in the fuel heater, said second conduit leading to atmosphere, valve means at the branching means of the duct and conduits for selectively and progressively closing either one of said conduits and simultaneously opening the other of said conduits, an actuator continuously responsive to fuel temperature for adjusting the position of said valve means to progressively block said first conduit as the fuel temperature rises, a fusible member connecting said actuator to said valve and being exposed to the hot gas in said duct and constructed to disintegrate when the gas temperature exceeds a predetermined value, and spring biasing means interconnecting said actuator to said valve means, to adjust valve means to close said first conduit when said fusible member disintegrates, irrespective of the position of said actuator.

5. A gas turbine engine having a flow series, compressor means, combustion means and turbine means; a hot air conveying duct communicating with said compressor means and receiving a supply of air therefrom which has been heated by being compressed in said compressor means, means branching said duct into first and second conduits, a fuel heater for heating fuel for the engine, means associating said first conduit with said fuel heater to supply hot air to impart heat to the fuel therein, said second conduit leading to atmosphere, valve means associated with the conduits for selectively closing either one and simultaneously opening the other, said valve means being so constructed that when the position of the valve means is changed to block one of said conduits by an increased amount, the valve means unblocks the other conduit by an equivalent amount, an actuator responsive to fuel temperature for positively adjusting the position of said valve means so as to progressively increasingly block said first conduit as the fuel temperature rises, a fusible member exposed to the hot air in said duct positively connecting said actuator to said valve means, said member being constructed to disintegrate when the temperature of the hot air exceeds a predetermined value, and spring biasing means to interconnect said actuator to said valve means in parallel to said fusible member so as to adjust said valve means to close said first conduit when said fusible member disintegrates irrespective of the position of said actuator.

References Cited in the file of this patent

UNITED STATES PATENTS

| | | |
|---|---|---|
| 1,596,845 | MacFarlane et al. | Aug. 17, 1926 |
| 2,028,149 | Goldsmith | Jan. 21, 1936 |
| 2,077,799 | Jones | Apr. 20, 1937 |
| 2,293,913 | Munson | Aug. 25, 1942 |
| 2,865,580 | Marshall | Dec. 23, 1958 |
| 2,925,712 | Johnson et al. | Feb. 23, 1960 |

FOREIGN PATENTS

| | | |
|---|---|---|
| 767,177 | Great Britain | Oct. 10, 1952 |